United States Patent [19]

Michels et al.

[11] Patent Number: 5,558,940

[45] Date of Patent: Sep. 24, 1996

[54] OIL- AND WATER-REPELLENT PAPERS, PROCESSES FOR THEIR PRODUCTION AND NEW FLUORINE-CONTAINING COPOLYMERS FOR THIS PURPOSE

[75] Inventors: Gisbert Michels, Köln; Joachim König, Odenthal; Uwe Zweering, Düsseldorf; Siegfried Korte, Odenthal, all of Germany

[73] Assignee: Bayer Aktiengesellschaft, Leverkusen, Germany

[21] Appl. No.: 502,985

[22] Filed: Jul. 17, 1995

[30] Foreign Application Priority Data

Jul. 27, 1994 [DE] Germany .................. 44 26 537.9
Jul. 27, 1994 [DE] Germany .................. 44 26 536.0

[51] Int. Cl.$^6$ ............................................. B32B 27/00
[52] U.S. Cl. ................................ 428/422; 526/245
[58] Field of Search ........................ 526/245; 428/422

[56] References Cited

U.S. PATENT DOCUMENTS

| | | |
|---|---|---|
| 4,366,299 | 12/1982 | Dessaint . |
| 5,247,008 | 9/1993 | Michels et al. . |
| 5,387,640 | 2/1995 | Michels et al. .......... 526/245 |

FOREIGN PATENT DOCUMENTS

| | | | |
|---|---|---|---|
| 0408917 | 1/1991 | European Pat. Off. .......... 526/245 |
| 0552630 | 7/1993 | European Pat. Off. .......... 526/245 |
| 59-12909 | 1/1984 | Japan .......................... 526/245 |

*Primary Examiner*—Joseph L. Schofer
*Assistant Examiner*—N. Sarofim
*Attorney, Agent, or Firm*—Sprung Horn Kramer & Woods

[57] ABSTRACT

Oil- and water-repellent papers are treated on the surface or in the pulp of the papers with fluorine-containing copolymers of a) acrylates containing perfluoroalkyl groups, of the formula $$CH_2=CR^1-COO-X-C_nF_{2n+1} \quad (I),$$

b) monomers of the formula $$CH_2=CR^2-COO-R^3 \quad (II),$$

c) monomers of the formula $$CH_2=CR^4-COO-(CH_2CH_2O)_m-R^5 \quad (III),$$

d) monomers of the formula $$CH_2=CR^6-COO-CH_2CH_2-N(R^7,R^8) \quad (IVa)$$

or, in salt-like form, of the formula $$[CH_2=CR^6-COO-CH_2CH_2-N(R^7,R^8,R^9)]^{\oplus}Y^{\ominus} \quad (IVb)$$

or, in N-oxidized form, of the formula $$CH_2=CR^6-COO-CH_2CH_2-N(R^7,R^8) \quad (IVc)$$
$$\downarrow$$
$$O$$

and e) monomers of the formula $$CH_2=CR^{10}CONHR^{11} \quad (V)$$

these substituents and indices in the formulae having the meaning given in the description and the copolymers comprising the monomers in amounts of a) =50 to 90% by weight, b) =1 to 35% by weight, c) =3 to 20% by weight, d) =1 to 20% by weight and e) = 0 to 10% by weight. Such copolymers having a content of e) =0.5 to 10% by weight are new.

18 Claims, No Drawings

OIL- AND WATER-REPELLENT PAPERS, PROCESSES FOR THEIR PRODUCTION AND NEW FLUORINE-CONTAINING COPOLYMERS FOR THIS PURPOSE

BACKGROUND OF THE INVENTION

1. Field of the Invention

The invention relates to new oil- and water-repellent papers which are treated on the surface or in the pulp with the fluorine-containing copolymers described below and to their production. The invention furthermore relates to new fluorine-containing copolymers for this purpose.

2. Description of the Related Art

Fluorine-containing treatment compositions based on perfluoroalkylphosphate salts have disadvantages in the production of oil- and water-repellent papers. Thus, for example, ammonium mono- and bis-(N-ethylperfluorooctanesulphonamidoethyl) phosphate is only oil-repellent but not water-repellent and fails above all when used in hard water. Although the diethanolamine salt of mono- and bis-(1H, 1H, 2H, 2H-perfluoroalkyl) phosphates shows an oil- and water-repellent action when used on the surface of paper, only oil-repellent but no water-repellent properties are observed when used in the pulp.

Although fluorine-containing copolymers according to U.S. Pat. No. 4,366,299 already represent improvements over the abovementioned fluorine compounds, the content of solvents caused by their preparation is a disadvantage, since it necessitates particular safety precautions during application because of the very low flash point.

Fluorine-containing copolymers according to U.S. Pat. No. 5,247,008 and aqueous, solvent-free dispersions prepared therefrom can also be employed for oil- and water-repellent treatment of papers. However, acceptable results are achieved at best by treatment on the surface of the papers; when used in the pulp, in contrast, significantly poorer results are achieved.

This disadvantage manifests itself in a particularly serious manner when chemical pulp based on waste paper is employed.

There has therefore continued to be efforts to discover oil- and water-repellent papers which can be treated both on the surface and in the pulp of the papers by using fluorine-containing, solvent-free copolymer dispersions without developing the disadvantages described above, it being necessary to meet the following prerequisites:

It must be ensured that the treated papers have both oil- and water-repellent properties.

The use of non-softened tap water during treatment of the papers should not lead to precipitates of the fluorine-containing copolymer dispersions or to losses of the oil- and water-repellent effect.

The fluorine-containing copolymer dispersions to be employed according to the invention must lead to good effect both when employed on the paper surface and when employed in the pulp.

It must be ensured that papers based on waste paper can be given an oil- and water-repellent treatment.

SUMMARY OF THE INVENTION

It has now been found, surprisingly, that copolymer dispersions with copolymers comprising monomers containing perfluoroalkyl groups, hydrophilic monomers and other monomers of the type described below are suitable for the production of oil- and water-repellent papers and meet the abovementioned prerequisites for this production, although only deviations from the prior art which seem to be supposedly insignificant exist.

The invention therefore relates to oil- and water-repellent papers treated on the surface or in the pulp of the papers with fluorine-containing copolymers of a) acrylates containing perfluoroalkyl groups, of the formula

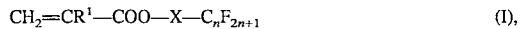
$$CH_2=CR^1-COO-X-C_nF_{2n+1} \quad (I),$$

b) monomers of the formula

$$CH_2=CR^2-COO-R^3 \quad (II),$$

c) monomers of the formula

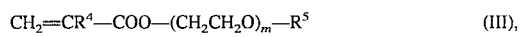
$$CH_2=CR^4-COO-(CH_2CH_2O)_m-R^5 \quad (III),$$

d) monomers of the formula

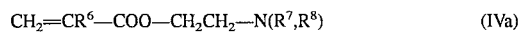
$$CH_2=CR^6-COO-CH_2CH_2-N(R^7,R^8) \quad (IVa)$$

or, in salt-like form, of the formula

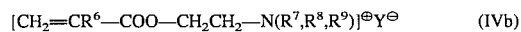
$$[CH_2=CR^6-COO-CH_2CH_2-N(R^7,R^8,R^9)]^{\oplus}Y^{\ominus} \quad (IVb)$$

or, in N-oxidized form, of the formula

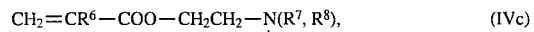
$$CH_2=CR^6-COO-CH_2CH_2-N(R^7,R^8), \quad (IVc)$$

and e) monomers of the formula

$$CH_2=CR^{10}CONHR^{11} \quad (V)$$

wherein, in the formulae, n denotes a number from 4 to 20, preferably from 6 to 16, or a mixture of various values of n and m denotes a number from 3 to 20 or a mixture of various values of m, X represents the formulae $-(CH_2)_o-$, $SO_2NR^{12}CH_2CHR^{13}-$ or $-O-(CH_2)_o-$, wherein o denotes a number from 1 to 4, $R^1$, $R^2$, $R^4$, $R^6$, $R^{10}$ and $R^{13}$ independently of one another denote hydrogen or methyl, $R^3$, $R^7$, $R^8$, $R^9$ and $R^{12}$ independently of one another represent straight-chain or branched $C_1$–$C_4$-alkyl, $R^5$ denotes hydrogen or straight-chain or branched $C_1$–$C_8$-alkyl and $R^{11}$ denotes hydrogen or straight-chain or branched $C_1$–$C_{12}$-alkyl, benzyl, $-CH_2OH$, $-CH_2OCH_3$, $-CH_2OC_4H_9$, $-(CH_2)_3N(CH_3)_2$ or $-(CH_2)N^{\oplus}(CH_3)_3Cl^{\ominus}$ and $Y^{\ominus}$ denotes one equivalent of a 1- to 3-valent anion, the copolymers comprising the monomers in amounts of a) =50 to 90% by weight, b) = 1 to 35% by weight, c) = 3 to 20% by weight, d) = 1 to 20% by weight and e) = 0 to 10% by weight, all based on the total amount of comonomers, and 0.1 to 2.0% by weight of the above copolymers, based on the pulp, being employed for treatment on the surface and 0.5 to 2.0% by weight of the above copolymers, based on the pulp, being employed for pulp treatment in the chemical pulp suspension, it being possible for non-softened tap water to be employed as the water and it being possible for starch and retention agents to be employed, in addition to the above copolymers, the treatment compositions according to U.S. Pat. No. 5,247,008 being excluded.

The treatment compositions of U.S. Pat. No. 5,247,008 comprise, as comonomers, a) 45–75% by weight of $C_nH_{2n+1}$—X—OCO—$CR^1$=$CH_2$, b) 10–50% by weight of $CH_2$=CH=CO=$OR^4$ and/or $CH_2$=$C(CH_3)$—CO—$OR^{12}$, c) 4–30% by weight of $CH_2$=$CR^5$—COO—$(CHR^6$—$CH_2O)_p$—$R^7$ and d) 1–15% by weight of $CH_2$=$CR^{11}$—COO—$CH_2$—$CH_2$—$N(R^8,R^9)$ or $[CH_2$=$CR^{11}$—COO—$CH_2CH_2$—$N(R^8,R^9,R^{10})]^{\oplus}y^{\ominus}$ or

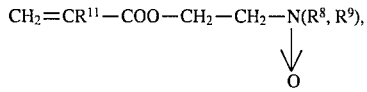

wherein, in the formulae,

X represents $-(CH_2)_m$—$SO_2$—$NR^2$—$CH_2$—$CHR^3$— or —O—$(CH_2)_m$ n denotes a number from 4 to 12 and m denotes a number from 1 to 4, $R^1$, $R^3$, $R^5$, $R^6$ and $R^{11}$ independently of one another represent hydrogen or methyl, $R^2$, $R^8$, $R^9$ and $R^{10}$ independently of one another denote $C_1$–$C_4$-alkyl, $R^4$ represents $C_1$–$C_{22}$-alkyl, $R^7$ represents $C_1$–$C_8$-alkyl, $R^{12}$ represents $C_2$–$C_{22}$-alkyl and $Y^{\ominus}$ denotes one equivalent of a 1- to 3-valent anion, and it furthermore being possible for the comonomers under b) to be replaced completely or in part by one or more from the group consisting of styrene, acrylonitrile, vinyl acetate, vinyl propionate and methyl methacrylate.

The invention furthermore relates to a process for the production of oil- and water-repellent papers by treatment of the papers on the surface or in the pulp with oil- and water-repellent substances, which is characterized in that fluorine-containing copolymers of the type described above, wherein n, m, $R^1$ to $R^{11}$, X and $Y^{\ominus}$ have the above scope of meaning, are employed for the treatment, 0.1 to 2.0% by weight of the above copolymers, based on the pulp, being employed for treatment on the surface and 0.5 to 2.0% by weight of the above copolymers, based on the pulp, being employed for pulp treatment of the chemical pulp suspension, it being possible for non-softened tap water to be employed as the water and it being possible for starch and retention agents to be employed in addition to the above copolymers, the use of copolymers according to U.S. Pat. No. 5,247,008 being excluded.

Finally, the invention relates to new fluorine-containing copolymers of a) 50–90% by weight of acrylates containing perfluoroalkyl groups, of the formula

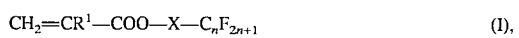

b) 1 to 35% by weight of monomers of the formula

c) 3 to 20% by weight of monomers of the formula

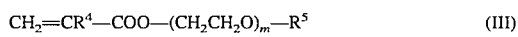

d) 1 to 20% by weight of monomers of the formula

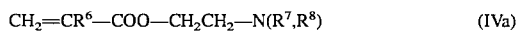

or, in salt-like form, of the formula

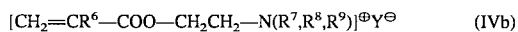

or, in N-oxidized form, of the formula

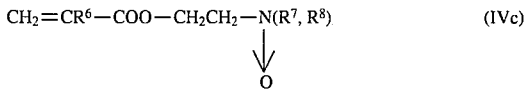

e) 0.5 to 10% by weight of monomers of the formula

wherein, in the formulae, n denotes a number from 4 to 20, preferably from 6 to 16, or a mixture of various values of n and m denotes a number from 3 to 20 or a mixture of various values of m, X represents the formulae —$(CH_2)_o$—, $SO_2NR^{12}CH_2CHR^{13}$— or —O—$(CH_2)_o$—, wherein o denotes a number from 1 to 4, $R^1$, $R^2$, $R^4$, $R^6$, $R^{10}$ and $R^{13}$ independently of one another denote hydrogen or methyl, $R^3$, $R^7$, $R^8$, $R^9$ and $R^{12}$ independently of one another represent straight-chain or branched $C_1$–$C_4$-alkyl, $R^5$ denotes hydrogen or straight-chain or branched $C_1$–$C_8$-alkyl and $R^{11}$ denotes hydrogen or straight-chain or branched $C_1$–$C_{12}$-alkyl, benzyl, —$CH_2OH$, —$CH_2OCH_3$, —$CH_2OC_4H_9$, —$(CH_2)_3N(CH_3)_2$ or —$(CH_2)N^{\oplus}(CH_3)_3Cl^{\ominus}$ and $Y^{\ominus}$ denotes one equivalent of a 1- to 3-valent anion.

DETAILED DESCRIPTION OF THE INVENTION

For treatment on the surface, the finished papers are treated with a dispersion of the fluorine-containing copolymers; if appropriate, excess dispersion is squeezed off, and the treated paper is then dried.

For treatment in the pulp, fluorine-containing copolymer or a dispersion thereof is added to the pulp or the already moulded paper, complete penetration of the pulp with fluorine-containing copolymer being achieved. After this addition, the papermaking operation is continued in the known manner.

The solids content and the amount of the dispersion of the copolymers to be used is chosen in a manner with which the expert is familiar such that the intended content of fluorine-containing copolymer in the paper is achieved. Furthermore, the entire remaining papermaking operation has been known for a long time and requires no detailed explanation.

The U.S. Pat. No. 5,247,008 discussed above discloses copolymers and dispersions thereof for which the monomer definitions largely lie outside the above definitions and of which the compositions in respect of component a) are shifted significantly towards lower values and in respect of components b) and c) are shifted significantly towards higher values compared with the above definitions. In contrast, the invention defined above relates to a choice; the copolymers and dispersions of U.S. Pat. No. 5,247,008 are expressly excluded by the above invention.

Preferred papers treated according to the invention are those in which the substituent $R^2$ in the above copolymers denotes hydrogen.

A copolymer of the above type which is furthermore preferably employed for the treatment is distinguished by the meaning of $R^3$=methyl.

Further preferred papers according to the invention are those where non-softened tap water is employed for their treatment.

Among the copolymers used for the treatment, those which have the composition of a) =65 to 85% by weight of (I), b) =2 to 25% by weight of (II), c) = 3 to 15% by weight of (III) and d) = 1 to 10% by weight of (IV) are preferred, treatment compositions according to U.S. Pat. No. 5,247,008 again being excluded.

The copolymers employed for the treatment particularly preferably have the composition of a) >75 to 85% by weight of (I), b) =3 to 15% by weight of (II), c) =3 to 15% by weight of (III) and d) =2 to 8% by weight of (IV).

The copolymers described above are employed in the form of aqueous largely or completely solvent-free dispersions for treatment of the papers according to the invention, the dispersions having 5 to 50%, preferably 10 to 40%, of their total weight of constituents (solids content) other than water.

Other preferred copolymers are characterized by the index n in component a), which assumes values of 6, 8, 10, 12, 14 and 16 or mixtures of several of these, and in the case of mixtures has an average value of 8 to 9.

Further preferred papers according to the invention are characterized by the use for their treatment for copolymers in which, in component c), $R^4$ denotes methyl and $R^5$ denotes hydrogen, and in which, independently thereof, the index m assumes values from 5 to 9.

Further preferred papers are those in which copolymers in which, in component d), $R^7$ and $R^8$ denote methyl and $R^9$ denotes hydrogen, and in the salt-like form of which the anion $Y^\ominus$ denotes chloride, acetate, ½ sulphate, $C_6$–$C_{10}$-aryl-, $C_7$–$C_{15}$-aralkyl- or $C_1$–$C_{18}$-alkyl-sulphonate or ⅓ phosphate, preferably ⅓ phosphate, are employed for the treatment.

Preferred new copolymers according to the invention are those which have the composition of a) =65 to 85% by weight of (I), preferably a) > 65 to 85% by weight of (I), b) = 2 to 25% by weight of (II), c) = 3 to 15% by weight of (III), d) = 1 to 10% by weight of (IV) and e) = 1 to 8% by weight of (V).

Preferred new copolymers according to the invention furthermore are those in which $R^1$ is hydrogen and X is —$CH_2CH_2$—, and the index n assumes values of 6, 8, 10, 12, 14, 16 or mixtures of several of these, and in the case of mixtures has an average value of 8 to 9.

Preferred new copolymers according to the invention furthermore those in which $R^3$ denotes methyl.

Preferred new copolymers according to the invention are furthermore those in which $R^4$ is methyl, $R^5$ is hydrogen and the index m, independently thereof, assumes the values from 5 to 9.

Preferred new copolymers according to the invention are furthermore those in which $R^6$, $R^7$ and $R^8$ denote methyl and $R^9$ represents hydrogen, and the anion $Y^\ominus$ represents chloride, acetate, ½ sulphate, $C_6$–$C_{10}$-aryl-, $C_7$–$C_{15}$-aralkyl- or $C_1$–$C_{18}$-alkyl-sulphonate or ⅓ phosphate, preferably ⅓ phosphate.

Preferred new copolymers according to the invention are furthermore those in which $R^{10}$ and, independently thereof, $R^{11}$ denote hydrogen.

The co-use of acrylamide as component e) in the copolymers according to the invention represents a further improvement of the fluorine-containing copolymers known from U.S. Pat. No. 5,247,008.

The new copolymers according to the invention can also impart oil- and water-repellent properties to other substrates, for example textiles, leather and mineral substrates.

The preparation of the copolymers employed for treatment of the papers according to the invention is carried out, for example, by polymerization of the monomers (I), (II), (III) and (IVa, b or c) together in solution. Solvents which can be employed are ethyl acetate, butyl acetate, acetone, methyl ethyl ketone, methyl isobutyl ketone, ethanol, isopropanol, tert-butanol and the like, which are known in principle to the expert. The copolymerization is preferably carried out in acetone. The polymerization here can be carried out discontinuously or continuously; for the discontinuous procedure, the batch or feed process may be mentioned.

Agents which form free radicals, such as, for example, azo compounds or peroxide, are employed as initiators for the polymerization. Examples which may be mentioned are: 2,2'-azo-bis(isobutyronitrile), 2,2'-azo-bis(methylbutyronitrile), tert-butyl perpivalate and tert-amyl peroxy-2-ethylhexanoate. Chain transfer agents, such as, for example, dodecylmercaptan, can be employed for regulation of the molecular weight.

The polymerization temperature is 40° to 100° C., preferably 50° to 90° C.

Aqueous dispersions of these copolymers are prepared by adding water to the solution of the copolymers after their preparation and distilling off at least some, preferably all, of the solvent. If component d) is used in the form of monomers of the formula (IVa) for the preparation of the copolymers, a neutralizing agent with anion $Y^\ominus$ of the type described above, preferably phosphoric acid, is added to the copolymer solution together with the water.

The solvents can be removed, for example, at elevated temperature (about 40° to 90° C.) in vacuo. It is in principle possible to leave a larger portion of the solvent used in the dispersions employed according to the invention. However, for work safety and industrial hygiene reasons, the solvent is preferably distilled off to the extent that the flashpoint of the resulting essentially aqueous dispersion is above 100° C. The aqueous dispersions are also stable after complete removal of the solvent.

The fluorine-containing copolymer dispersions of the type described above can be employed according to the invention both on the paper surface and in the pulp of the papers. Suitable raw materials for preparation of the papers treated in the pulp can be, for example, bleached and unbleached chemical pulps, wood pulp, waste papers and deinking pulps. The papers can be produced, for example, under acid or neutral conditions and comprise the customary additives, such as, for example, fillers, paper auxiliaries (for example retention, fixing, wet strength and sizing agents), dyestuffs and optical brighteners. Suitable base papers for treatment on the surface can comprise the abovementioned raw materials. Liquors which comprise the fluorine-containing active substance and, if appropriate, starch and other additives, such as, for example, dyestuffs, optical brighteners, sizing agents and wet strength agents, in which case mutual compatibility in the sizing press liquor is to be ensured, are prepared for treatment of the papers on the surface. Base papers are treated by a padding method, for example in the sizing press, with these liquors and are then dried. For use in the pulp, 0.5 to 2.0% by weight, based on the pulp, of active substance and preferably a retention agent are added to the chemical pulp suspension. Thereafter, the sheet of paper is formed and is then dried. It is possible to employ non-softened tap water in all these operations, whereby the production of the papers treated according to the invention is particularly economical.

The use of methyl acrylate as component b) of the copolymers for the treatment leads to particularly good results of the treatment of papers both by treatment on the paper surface and by treatment in the pulp.

The following test methods are used to evaluate the oil- and water-repellent action of the treated papers:

1. The water-repellency is determined by the Cobb absorption of water (DIN 53 132) over a contact time of 60 seconds.
2. The oil-repellency is determined by the absorption of turpentine oil (analogously to DIN 53 132) over a contact time of likewise 60 seconds.
3. Another test method for determination of the oil-repellency is carded out by applying in each case one drop (0.05 ml) of turpentine oil or xylene to the surface of the treated papers. The time (up to a maximum of 180 minutes or a maximum of 240 minutes respectively) taken for the drop to penetrate completely into the paper is determined. The higher the time measured, the higher the oil-repellent action.

EXAMPLES

Preparation of the fluorocarbon dispersions

Example 1

The polymerization was carried out in a reactor with a thermometer, stirrer and reflux condenser. For this, a solution of 76.0 parts by weight of $CH_2=CHCOOCH_2CH_2C_nF_{2n+1}$ (mixture where n=6, 8, 10, 12, 14, 16)

13.5 parts by weight of methyl acrylate 7.5 parts by weight of $CH_2=C(CH_3)COO(CH_2CH_2O)_8H$ and 3.0 parts by weight of dimethylaminoethyl methacrylate in 300.0 parts by weight of acetone
was prepared.

2.25% by weight of tert-butyl perpivalate (75% strength) was added to the solution and the mixture was stirred at 56° C. under a nitrogen atmosphere for 10 hours. A solution of 1.2 parts by weight of phosphoric acid (85% strength) in 300 parts by weight of deionized water
was added to the polymer solution, which had been cooled to 50° C., and the mixture was stirred. The acetone was removed by distillation at 60° C./200 to 300 mbar and the solids content of the dispersion was brought to 25.0% by weight.

Examples II to VII

Examples II to VII were carried out in the same manner as in Example I, the monomers employed being described in the following table:

| Monomers (parts by weight) | II | III | IV | V | VI | VII |
|---|---|---|---|---|---|---|
| $CH_2=CHCOOCH_2CH_2C_nF_{2n+1}$ (mixture with n = 6, 8, 10, 12, 14, 16) | 80 | 85 | 76 | 78 | 78 | 78 |
| Methyl acrylate | 9.5 | 4.5 | — | 6.5 | 7.5 | 8.5 |
| Methyl methacrylate | — | — | 13.5 | — | — | — |
| $CH_2=C(CH_3)COO(CH_2CH_2O)_8H$ | 7.5 | 7.5 | 7.5 | 12.5 | 12.5 | 12.5 |
| Dimethylaminoethyl methacrylate | 3 | 3 | 3 | 3 | 2 | 1 |

Example VIII

The polymerization was carried out in a reactor with a thermometer, stirrer and reflux condenser. For this, a solution of 70.0 parts by weight of $CH_2=CHCOOCH_2CH_2C_nF_{2n+1}$ (mixture where n= 6, 8, 10, 12, 14, 16)

16.5 parts by weight of methyl acrylate 7.5 parts by weight of $CH_2=C(CH_3)COO(CH_2CH_2O)_8H$ and 3.0 parts by weight of dimethylaminoethyl methacrylate in 3.0 parts by weight of acrylamide and 300.0 parts by weight of acetone
was prepared.

2.25% by weight of tert-butylperpivalate (75% strength) was added to the solution and the mixture was stirred at 56° C. under a nitrogen atmosphere for 10 hours. A solution of 1.2 parts by weight of phosphoric acid (85% strength) in 300 parts by weight of deionized water
was added to the polymer solution, which had been cooled to 50° C., and the mixture was stirred. The acetone was removed by distillation at 60° C./200 to 300 mbar and the solids content of the dispersion was brought to 25.0% by weight.

Examples IX to XVII

Examples IX to XVII were carried out in the same manner as in Example VIII, the monomers employed being described in the following table:

| Monomers (parts by weight) | IX | X | XI | XII | XIII | XIV | XV | XVI | XVII |
|---|---|---|---|---|---|---|---|---|---|
| $CH_2=CHCOOCH_2CH_2C_nF_{2n+1}$ (mixture with n = 6, 8, 10, 12, 14, 16) | 60 | 75 | 70 | 70 | 70 | 70 | 70 | 70 | 75 |
| Methyl acrylate | 26.5 | 11.5 | 12.5 | 13.5 | 17.5 | 18.5 | — | 19.5 | 14.5 |
| Methyl methacrylate | — | — | — | — | — | — | 16.5 | — | — |
| $CH_2=C(CH_3)COO(CH_2CH_2O)_8H$ | 7.5 | 7.5 | 12.5 | 12.5 | 7.5 | 7.5 | 7.5 | 7.5 | 7.5 |
| Dimethylaminoethyl methacrylate | 3 | 3 | 2 | 1 | 3 | 3 | 3 | 3 | 3 |
| Acrylamide | 3 | 3 | 3 | 3 | 2 | 1 | 3 | — | — |

Use Examples 1 to 7

Oil- and water-repellent treatment of papers on the surface 2.0% by weight (based on the liquor weight) of a fluorocarbon dispersion (Examples I–VII) was added to 5% strength starch solution (potato starch (Perfectamyl® A 4692)), which had been prepared with tap water (about 17° dH=German hardness). Base papers comprising 50% bleached birch sulphate and 50% bleached pine sulphate chemical pulp with a degree of freeness of 35° SR were treated with this liquor in a laboratory sizing press (Mathis; wet pick-up: 80%) and dried for 2 minutes at 90° C. in a drying cylinder. After conditioning in the room atmosphere for 2 hours, the treated papers were tested by the Cobb test with water and turpentine oil and by the drop test with turpentine oil and xylene.

Oil- and water-repellent treatment of papers in the pulp

A mixture of 50% birch sulphate chemical pulp and 50% pine sulphate chemical pulp was beaten to about 35° SR and brought to a pulp density of 2.5% with tap water (about 17° dH).

140 ml of this chemical pulp suspension were diluted with 150 ml of tap water. 4.0% by weight of a fluorocarbon dispersion (Examples I–VII) and 0.3% by weight of a retention agent (based on a polyamidoamine, for example Retaminol H from Bayer AG) from a 1% strength dilution were added in succession, the weight data of the fluorocarbon dispersion and of the retention agent relating to the pulp. After the mixture had been stirred for about 20 seconds, the sheet of paper was formed on a manual sheet former. The sheets were pressed off between felts and dried in a drying cylinder for 4 minutes at 90° C. Testing was carried out as for the papers treated on the surface.

All the results are summarized in the following table; the index a after the example number represents the results for surface treatment, and the index b represents those for treatment in the pulp.

| Ex. | Dispersion | Cobb test (water) (g/m²) | Cobb test (turpentine oil) (g/m²) | Drop test turpentine oil (min) | Drop test xylene (min) |
|---|---|---|---|---|---|
| 1a | I | 16.2 | 2.8 | >180 | 61 |
| 1b | I | 20.0 | 2.2 | >180 | 65 |
| 2a | II | 17.5 | 3.0 | >180 | 66 |
| 2b | II | 19.5 | 2.5 | >180 | 67 |
| 3a | III | 17.1 | 2.5 | >180 | 62 |
| 3b | III | 21.5 | 2.0 | >180 | 65 |
| 4a | IV | 21.0 | 6.5 | 165 | 55 |
| 4b | IV | 25.0 | 4.3 | 170 | 59 |
| 5a | V | 17.2 | 3.0 | >180 | 62 |
| 5b | V | 33 | 6.3 | 160 | 51 |
| 6a | VI | 17.6 | 3.5 | >180 | 65 |
| 7a | VII | 16.3 | 2.2 | >180 | 69 |

Examples 1 to 3 show that when methyl acrylate was used for preparation of the fluorocarbon dispersions, particularly good results were obtained in the treatment both on the paper surface and in the pulp.

Example 4 shows that if methyl acrylate is used, significantly better results are obtained than if methyl methacrylate is used.

In Examples 5 to 7, in which fluorocarbon dispersions with an increased hydrophilic content due to polyethylene oxide monomethyl acrylate (monomer III) were employed, a very good treatment on the paper surface was still obtained.

However, the results of the treatment in the pulp were poorer, the lower the content of dimethylaminoethyl methacrylate.

These examples show that the composition of the fluorocarbon resin must be balanced in respect of the hydrophilic components.

Use Examples 8 to 17

Oil- and water-repellent treatment of papers on the surface 2.0% by weight (based on the liquor weight) of a fluorocarbon dispersion (Examples VIII–XVII) were added to 5% strength starch solution (potato starch (Perfectamyl® A 4692)), which had been prepared with tap water (about 17° dH=German hardness). Base papers comprising 50% bleached birch sulphate and 50% bleached pine sulphate chemical pulp with a degree of freeness of 35° SR were treated with this liquor in a laboratory sizing press (Mathis; wet pick-up: 80%) and dried for 2 minutes at 90° C. in a drying cylinder. After conditioning in the room atmosphere for 2 hours, the treated papers (80 g/m²) were tested by the Cobb test with water and the drop test with turpentine oil and xylene. The results of the surface treatment are summarized in the following table.

| Ex. | Dispersion | Cobb test water, g/m² | Drop test turpentine oil (min) | Drop test xylene (min) |
|---|---|---|---|---|
| 8 | VIII | 19.1 | >240 | 58 |
| 9 | IX | 26.0 | 195 | 45 |
| 10 | X | 18.5 | >240 | 60 |
| 11 | XI | 20.5 | >240 | 61 |
| 12 | XII | 19.3 | >240 | 63 |
| 13 | XIII | 24.5 | >240 | 57 |

-continued

| Ex. | Dispersion | Cobb test water, g/m² | Drop test turpentine oil (min) | Drop test xylene (min) |
|---|---|---|---|---|
| 14 | XIV | 25.0 | >240 | 56 |
| 15 | XV | 28.0 | 230 | 53 |
| 16 | XVI | 25.1 | 210 | 48 |
| 17 | XVII | 24.5 | 230 | 54 |

Use Examples 18 to 27

Oil- and water-repellent treatment of papers in the pulp

A mixture of 70% of birch sulphate chemical pulp and 30% of pine sulphate chemical pulp which additionally comprises 25% of CaCO₃ was beaten to about 35° SR and brought to a pulp density of 2.5% with tap water (about 17° dH).

140 ml of this chemical pulp suspension were diluted with 150 ml of tap water. 3.0% by weight of a fluorocarbon dispersion (Examples VIII–XVII) and 0.3% by weight of a retention agent (based on a polyamidoamine, for example Retaminol H from Bayer AG) from a 1% strength dilution were added in succession, the weight data of the fluorocarbon dispersion and of the retention agent being based on the pulp. After the mixture had been stirred for 20 seconds, the sheet of paper was formed on a manual sheet former. The sheets (80 g/m²) were pressed off between felts and dried in a drying cylinder for 4 minutes at 90° C. Testing was carried out as for the papers treated on the surface.

The results of the treatment in the pulp are summarized in the following table.

| Ex. | Dispersion | Cobb test (water, g/m²) | Drop test turpentine oil (min) | Drop test xylene (min) |
|---|---|---|---|---|
| 18 | VIII | 19.5 | >240 | 59 |
| 19 | IX | 25.1 | 200 | 49 |
| 20 | X | 17.3 | >240 | 60 |
| 21 | XI | 22.1 | >240 | 58 |
| 22 | XII | 20.8 | >240 | 61 |
| 23 | XIII | 23.3 | >240 | 55 |
| 24 | XIV | 24.0 | >240 | 56 |
| 25 | XV | 26.3 | >240 | 55 |
| 26 | XVI | 26.5 | 235 | 50 |
| 27 | XVII | 23.3 | 240 | 53 |

Use Examples 28 to 31

Oil- and water-repellent treatment in the pulp

A mixture of 50% bogus paper and 50% newspapers (waste paper) was employed instead of the birch sulphate and pine sulphate chemical pulp. 4.0% by weight of a fluorocarbon dispersion (Example VIII, X, XVI, XVII) was employed (results in the following table).

| Ex. | Dispersion | Cobb test (water, g/m²) | Drop test turpentine oil (min) | Drop test xylene (min) |
|---|---|---|---|---|
| 28 | VIII | 18.2 | >240 | 49 |
| 29 | X | 17.4 | >240 | 52 |
| 30 | XVI | 21.3 | 235 | 24 |
| 31 | XVII | 19.5 | >240 | 32 |

The copolymers from Examples XVI and XVII (without acrylamide) demonstrate that the use of acrylamide (component e)) in copolymers VIII and X according to the invention results in further clear improvement in the treatment in the pulp.

What is claimed is:

1. Oil- and water-repellent papers treated on the surface or in the pulp of the papers with fluorine-containing copolymers of a) acrylates containing perfluoroalkyl groups of the formula $$CH_2=CR^1—COO—X—C_nF_{2n+1} \quad (I),$$

b) monomers of the formula $$CH_2=CR^2—COO—R^3 \quad (II),$$

c) monomers of the formula $$CH_2=CR^4—COO—(CH_2CH_2O)_m—R^5 \quad (III),$$

d) monomers of the formula $$CH_2=CR^6—COO—CH_2CH_2—N(R^7,R^8) \quad (IVa)$$

or, in salt-like form, of the formula $$[CH_2=CR^6—COO—CH_2CH_2—N(R^7,R^8,R^9)]^{\oplus}Y^{\ominus} \quad (IVb)$$

or, in N-oxidized form, of the formula $$CH_2=CR^6—COO—CH_2CH_2—N(R^7, R^8), \quad (IVc)$$
$$\downarrow$$
$$O$$

and e) monomers of the formula $$CH_2=CR^{10}CONHR^{11} \quad (V)$$

wherein, in the formulae, n denotes a number from 4 to 20, or a mixture of various values of n and m denotes a number from 3 to 20 or a mixture of various values of m, X represents the formulae —(CH₂)ₒ—, SO₂NR¹²CH₂CHR¹³— or —O—(CH₂)ₒ—, wherein o denotes a number from 1 to 4, R¹, R², R⁴, R⁶, R¹⁰ and R¹³ independently of one another denote hydrogen or methyl, R³, R⁷, R⁸, R⁹ and R¹² independently of one another represent straight-chain or branched C₁–C₄-alkyl, R⁵ denotes hydrogen or straight-chain or branched C₁–C₈-alkyl and R¹¹ denotes hydrogen or straight-chain or branched C₁–C₁₂-alkyl, benzyl, —CH₂OH, —CH₂OCH₃, —CH₂OC₄H₉, —(CH₂)₃N(CH₃)₂ or —(CH₂)N⁺(CH₃)₃Cl⁻ and Y⁻ denotes one equivalent of a 1- to 3-valent anion, the copolymers comprising the monomers in amounts of a) = 50 to 90% by weight, b) = 1 to 35% by weight, c) = 3 to 20% by weight, d) = 1 to 20% by weight and e) = 0 to 10% by weight, all based on the total amount of comonomers, and 0.1 to 2.0% by weight of the above copolymers, based on the pulp, being employed for treatment on the surface and 0.5 to 2.0% by weight of the above copolymers, based on the pulp, being employed for pulp treatment in the chemical pulp suspension, it being possible for non-softened tap water to be employed as the water and it being possible for starch and retention agents to be employed, in addition to the above copolymers, the treatment compositions according to U.S. Pat. No. 5,247,008 being excluded.

2. Fluorine-containing copolymers of a) 50 to 90% by weight of acrylates containing perfluoroalkyl groups, of the formula $$CH_2=CR^1-COO-X-C_nF_{2n+1} \qquad (I),$$

b) 1 to 35% by weight of monomers of the formula $$CH_2=CR^2-COO-R^3 \qquad (II),$$

c) 3 to 20% by weight of monomers of the formula $$CH_2=CR^4-COO-(CH_2CH_2O)_m-R^5 \qquad (III),$$

d) 1 to 20% by weight of monomers of the formula $$CH_2=CR^6-COO-CH_2CH_2-N(R^7,R^8) \qquad (IVa)$$

or, in salt-like form, of the formula $$[CH_2=CR^6-COO-CH_2CH_2-N(R^7,R^8,R^9)]^\oplus Y^\ominus \qquad (IVb)$$

or, in N-oxidized form, of the formula $$CH_2=CR^6-COO-CH_2CH_2-N(R^7,R^8) \qquad (IVc)$$
$$\downarrow$$
$$O$$

and e) 0.5 to 10% by weight of monomers of the formula $$CH_2=CR^{10}CONHR^{11} \qquad (V)$$

wherein, in the formulae, n denotes a number from 4 to 20, or a mixture of various values of n and m denotes a number from 3 to 20 or a mixture of various values of m, X represents the formulae $-(CH_2)_o-$, $SO_2NR^{12}CH_2CHR^{13}-$ or $-O-(CH_2)_o-$, wherein o denotes a number from 1 to 4, $R^1$, $R^2$, $R^4$, $R^6$, $R^{10}$ and $R^{13}$ independently of one another denote hydrogen or methyl, $R^3$, $R^7$, $R^8$, $R^9$ and $R^{12}$ independently of one another represent straight-chain or branched $C_1-C_4$-alkyl, $R^5$ denotes hydrogen or straight-chain or branched $C_1-C_8$-alkyl and $R^{11}$ denotes hydrogen or straight-chain or branched $C_1-C_{12}$-alkyl, benzyl, $-CH_2OH$, $-CH_2OCH_3$, $-CH_2OC_4H_9$, $-(CH_2)_3N(CH_3)_2$ or $-(CH_2N)^\oplus(CH_3)_3Cl^\ominus$ and $Y^\ominus$ denotes one equivalent of a 1- to 3-valent anion.

3. The papers of claim 1, treated with copolymers having the composition of a) = 60 to 90% by weight, b) = 1 to 35% by weight, c) = 3 to 20% by weight, d) = 1 to 20% by weight and e) = 0% by weight, the treatment compositions according to U.S. Pat. No. 5,247,008 being excluded.

4. The papers of claim 3, treated with copolymers having the composition of a) = 65 to 85% by weight, b) = 2 to 25% by weight, c) = 3 to 15% by weight, d) = 1 to 10% by weight and e) = 0% by weight, the treatment compositions according to U.S. Pat. No. 5,247,008 being excluded.

5. The papers of claim 4, treated with copolymers having the composition of a) >75 to 85% by weight, b) = 3 to 15% by weight, c) = 5 to 15% by weight, d) = 2 to 8% by weight and e) 0% by weight.

6. The papers of claim 1, wherein in formula (I) of the comonomer a) n denotes a number from 6 to 16 or a mixture of various values of n.

7. The papers of claim 1, treated with copolymers in which, in component b), $R^2$ denotes hydrogen.

8. The papers of claim 1, treated with copolymers in which, in component b), $R^3$ denotes methyl.

9. The papers of claim 1, treated with copolymers in which, in component c), $R^4$ denotes methyl and $R^5$ denotes hydrogen.

10. The papers of claim 1, treated with copolymers in which, in component c) the index m assumes values from 5 to 9.

11. The papers of claim 1, treated with copolymers in which, in component d), $R^7$ and $R^8$ denote methyl and $R^9$ denotes hydrogen, and in the salt-like form thereof, the anion $Y^\ominus$ denotes chloride, acetate, ½ sulphate, $C_6-C_{10}$-aryl-, $C_7-C_{15}$-aralkyl- or $C_1-C_{18}$-alkyl-sulphonate or ⅓ phosphate.

12. The papers of claim 11, treated with copolymers in which the anion $Y^\ominus$ denotes ⅓ phosphate.

13. The copolymers of claim 2, in which the meaning of $R^6$, $R^7$ and $R^8$=methyl and $R^9$=hydrogen, and in which in (IVb), the anion $Y^\ominus$ represents chloride, acetate, ½ sulphate, $C_6-C_{10}$-aryl, $C_7-C_{15}$-aralkyl- or $C_1$-$Cl_{18}$-alkyl-sulphonate or ⅓ phosphate.

14. The copolymers of claim 13, in which the anion $Y^\ominus$ represents ⅓ phosphate.

15. The copolymers of claim 13, having the composition of a) = 65 to 85% by weight of (I), b) = 2 to 25% by weight of (II), c) = 3 to 15% by weight of (III), d) = 1 to 10% by weight of (IV) and e) = 1 to 8% by weight of (V).

16. The copolymers of claim 15, having the composition of a) >65 to 85% by weight of (I), b) 2 to 25% by weight of (II), c) 3 to 15% by weight of (IV) and e) = 1 to 8% by weight of (V).

17. The copolymers of claim 2, in which the meaning of $R^1$ is H and X is $-CH_2CH_2-$.

18. The copolymers of claim 2, wherein, in formula (I) of the comonomer a), n denotes a number from 6 to 16 or a mixture of various values of n.

* * * * *